United States Patent
Clark et al.

[11] 3,919,565
[45] Nov. 11, 1975

[54] OVERCURRENT SENSE CIRCUIT

[75] Inventors: Virgil R. Clark, Stewartville; Carroll D. Goodew, Rose Creek; Terrance W. Kueper, Rochester; Byron H. Price, Byron, all of Minn.

[73] Assignee: International Business Machines Corporation, Armonk, N.Y.

[22] Filed: Apr. 8, 1974

[21] Appl. No.: 458,638

[52] U.S. Cl. .......... 307/235 R; 307/202; 340/253 A; 340/253 P
[51] Int. Cl.² ..................... H03K 5/20; H02H 7/20
[58] Field of Search..... 307/202, 235 R; 340/253 A, 340/253 P

[56] References Cited
UNITED STATES PATENTS
| | | | |
|---|---|---|---|
| 3,076,135 | 1/1963 | Farnsworth et al. | 307/235 X |
| 3,173,078 | 3/1965 | Farnsworth | 307/202 X |
| 3,295,052 | 12/1966 | Martin | 307/235 X |

Primary Examiner—John Zazworsky
Attorney, Agent, or Firm—Donald F. Voss

[57] ABSTRACT

An overcurrent sense circuit for sensing an overcurrent condition at the output of a power supply uses inherent D.C. resistance and the voltage drop associated with current flow through that resistance to generate a logic signal indicating the overcurrent condition. A current source offsets the maximum allowable voltage drop across the equivalent resistance for normal operation. The offset voltage and voltage drop across the equivalent resistance are fed into a comparator. When the voltage drop across the equivalent resistance exceeds the maximum allowable voltage drop due to an overcurrent condition, the comparator switches and thereby provides an output indicating the overcurrent condition.

7 Claims, 2 Drawing Figures

OVERCURRENT SENSE CIRCUIT

BACKGROUND OF THE INVENTION

1. Field of the Invention

This invention relates to overcurrent sense circuits and more particularly to overcurrent sense circuits for sensing overcurrent conditions in a power supply.

The invention finds particular utility in sensing overcurrent conditions in power supplies for computer systems. This is because it is sensitive to extremely small overcurrent conditions and yet is insensitive to supply voltage variation. Also, it permits the computer system user to re-try an operation, because it does not cause an interruption which requires maintenance attention such as required by a blown fuse.

2. Description of the Prior Art

Traditionally it has been the practice to protect a power supply and utilization system from an overcurrent condition by fuses, overload circuit breakers and other like devices. These devices are generally adequate for protection purposes but they usually do not permit automatic restoration of the power supply. In the present invention, the overcurrent condition is sensed in a manner to permit automatic restoration of the power supply. The present invention also makes it easy to diagnose the source of the overcurrent condition.

SUMMARY OF THE INVENTION

The principal objects of the invention are to provide an improved overcurrent sense circuit which:

a. enables automatic recovery from the overcurrent condition;

b. is sensitive to extremely small overcurrent conditions;

c. is insensitive to power supply voltage variations, d. is insensitive to high frequency noise, and e. is easily adjustable.

The foregoing objects are achieved by detecting a voltage drop across the inherent D.C. resistance in the power supply line greater than a predetermined offset voltage generated from a current source to indicate the overcurrent condition.

By varying the current from the current source, the maximum tolerable overcurrent condition can be changed. By using a voltage drop or differential for detection purposes, the overcurrent sense circuit is insensitive to power supply voltage variations. The overcurrent sense circuit can be sensitive to extremely small overcurrent conditions because extremely small voltage drops can be sensed by detecting when they exceed extremely small offset voltages.

DESCRIPTION

Figure 1:
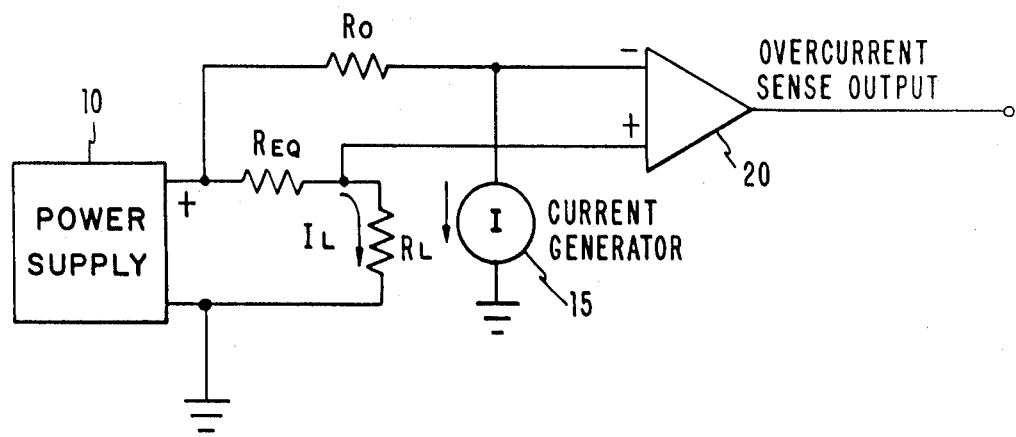
FIG. 1 is a schematic circuit diagram generally illustrating the invention.

With reference to the drawings, and particularly to FIG. 1, the invention is illustrated as an overcurrent sense circuit for a power supply. Power supply 10 furnishes power to a load RL. The resistor REQ is either an impedance which is part of the power supply or an impedance inserted in series with the output line of the power supply and it provides a voltage drop indicative of the amount of load current. In one instance, an inductor in the power supply was used for the impedance REQ. In another instance, a piece of resistance wire was inserted in series with the output line of the power supply. A resistance wire having a resistance of 0.012 ohms was used in a power supply having an output voltage of 12 volts.

An offset voltage is generated by current generator 15 and resistor RO so as to set a maximum allowable voltage drop across resistor REQ for normal operation. The offset voltage makes the high voltage side of resistor REQ to look low to comparator 20. When an overcurrent condition exists, the high voltage side seen by the comparator remains at the same voltage level as set by the current source, however, the low voltage side of resistor REQ goes lower because of the greater voltage across REQ and the output of comparator 20 switches to indicate the overcurrent condition. It should be noted that if there is not a true overcurrent condition such as when the power supply line voltage rises, comparator 20 will not switch to indicate an overcurrent condition. This is because as the power supply voltage rises and there is no change in load current, the voltage drop across resistor REQ remains the same and there is no differential to cause the comparator 20 to switch. This is beneficial because it makes it easier to diagnose the real problem when an overcurrent condition really occurs. If the overcurrent sense circuit did indicate an overcurrent condition due to an increase in line voltage, there would be no way of determining that it was the line voltage which caused the overcurrent condition rather than the load causing the overcurrent condition.

Figure 2:
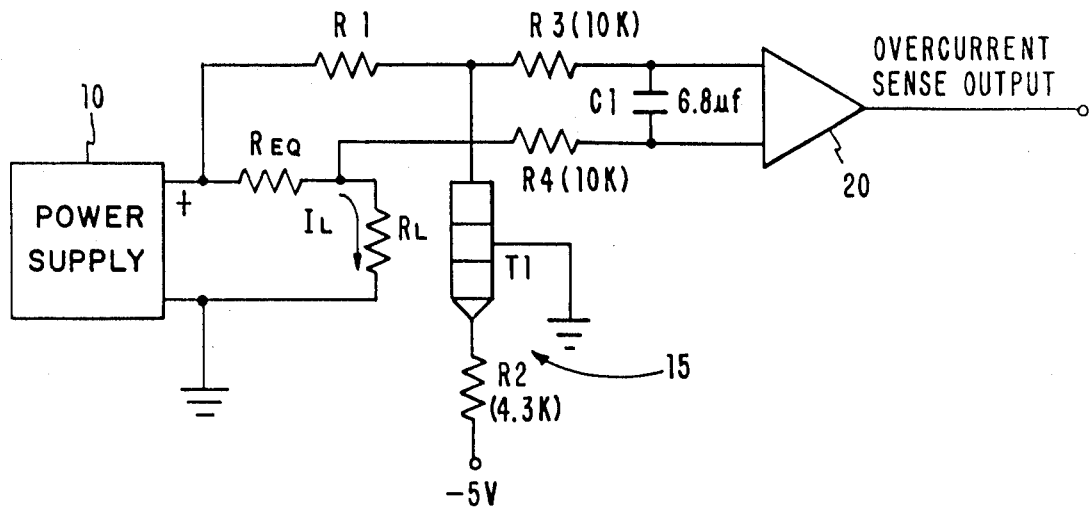
FIG. 2 is a schematic circuit diagram illustrating a preferred embodiment of the invention including high frequency noise suppression.

In FIG. 2, the transistor T1 and resistor R2 form the current generator 15 and an offset voltage is developed with resistor R1. Resistors R3 and R4 and capacitor C1 provide noise suppression at high frequencies. The need for the high frequency noise suppression is that power supply 10 can be a high frequency type of power supply and therefore it would be necessary to prevent high frequency noise from switching comparator 20 and eliminate a false indication of an overcurrent condition. The combination of resistors R3, R4 and capacitor C1 causes signals above 1KHz to by-pass comparator 20. At frequencies above 1KHz, capacitor C1 appears as a short circuit and at lower frequencies it presents a very high impedance path.

So far as sensing the overcurrent condition, the circuit of FIG. 2 operates substantially the same way as the circuit of FIG. 1. The base of transistor T1 is connected to ground potential and its emitter is connected to −5 volts via resistor R2 whereby transistor T1 is normally conducting and causes a current flow through resistor R1 to generate an offset voltage. This offset voltage makes the high voltage side of resistor REQ appear low to comparator 20 relative to the low voltage side of resistor REQ. However, when load RL draws a current amounting to an overcurrent the high voltage side of resistor REQ remains the same but the low voltage side thereof goes lower. This change in voltage is seen by comparator 20 and its switches to indicate the overcurrent condition.

Comparator 20 is a conventional differential amplifier which has an output at one voltage level when one input is at a higher voltage level than the other input. The output of the differential amplifier switches to another voltage level when the other input voltage becomes greater than the one input voltage. This change in output voltage level is the signal for indicating the overcurrent condition. The current provided by transistor T1 can be easily changed so as to change the maximum tolerable overcurrent condition. As a practical matter, the way to do this is to either change the value of resistor R2 and thereby change the amount of current conducted by transistor T1 or change the value of resistor R1 to change the offset voltage.

From the foregoing it is seen that the invention provides an overcurrent sense circuit which can be sensitive to extremely small overcurrent conditions. This is because the resistance REQ can be made very small such as a few milliohms and similarly the offset voltage provided by the current source 15 and resistor R1 can be on the order of a few millivolts. Further it is seen that the maximum allowable overcurrent condition can be changed by merely changing the current provided by current source 15. It is also seen that the overcurrent sense circuit is insensitive to power supply voltage variations because the voltage drop across resistor REQ with a given current remains the same even though the power supply voltage may vary. Further, since no fuse is blown, the overcurrent sense circuit enables automatic recovery from the overcurrent condition.

We claim:

1. An overcurrent sense circuit for sensing an overcurrent in a load connected across a power supply subject to voltage variations comprising:
    means connected between said power supply and load for generating a voltage drop proportional to current flowing through said load,
    means including a constant current generator connected across said power supply for generating an offset voltage equal to a predetermined maximum voltage independent of voltage variations occurring in said power supply, and
    comparator means connected to receive said voltage drop and said offset voltage and generate one output level when said voltage drop is less than said offset voltage and another output level when said voltage drop exceeds said offset voltage.

2. The overcurrent sense circuit of claim 1 wherein said means for generating said voltage drop is a resistance element.

3. The overcurrent sense circuit of claim 1 wherein said means for generating said offset voltage further includes
    a resistor connected to said constant current generator.

4. The overcurrent sense circuit of claim 1 wherein said comparator means is an operational amplifier.

5. The overcurrent sense circuit of claim 3 wherein said constant current generator comprises
    a transistor,
    a voltage source,
    and a resistor connected between said voltage source and said transistor.

6. The overcurrent sense circuit of claim 1 further comprising
    a high frequency noise suppression circuit connected between said comparator means and said means for generating said voltage drop and said offset voltage.

7. The overcurrent sense circuit of claim 6 wherein said high frequency noise suppression circuit comprises
    a pair of resistors, and
    a capacitor connected across said resistors whereby said capacitor presents a low impedance path to high frequency noise signals to shunt the same from said comparator means.

* * * * *